Sept. 5, 1933.    F. M. REID    1,925,279
TRACTOR SEMITRAILER FIFTH WHEEL STRUCTURE
Filed Jan. 29, 1932    2 Sheets-Sheet 1
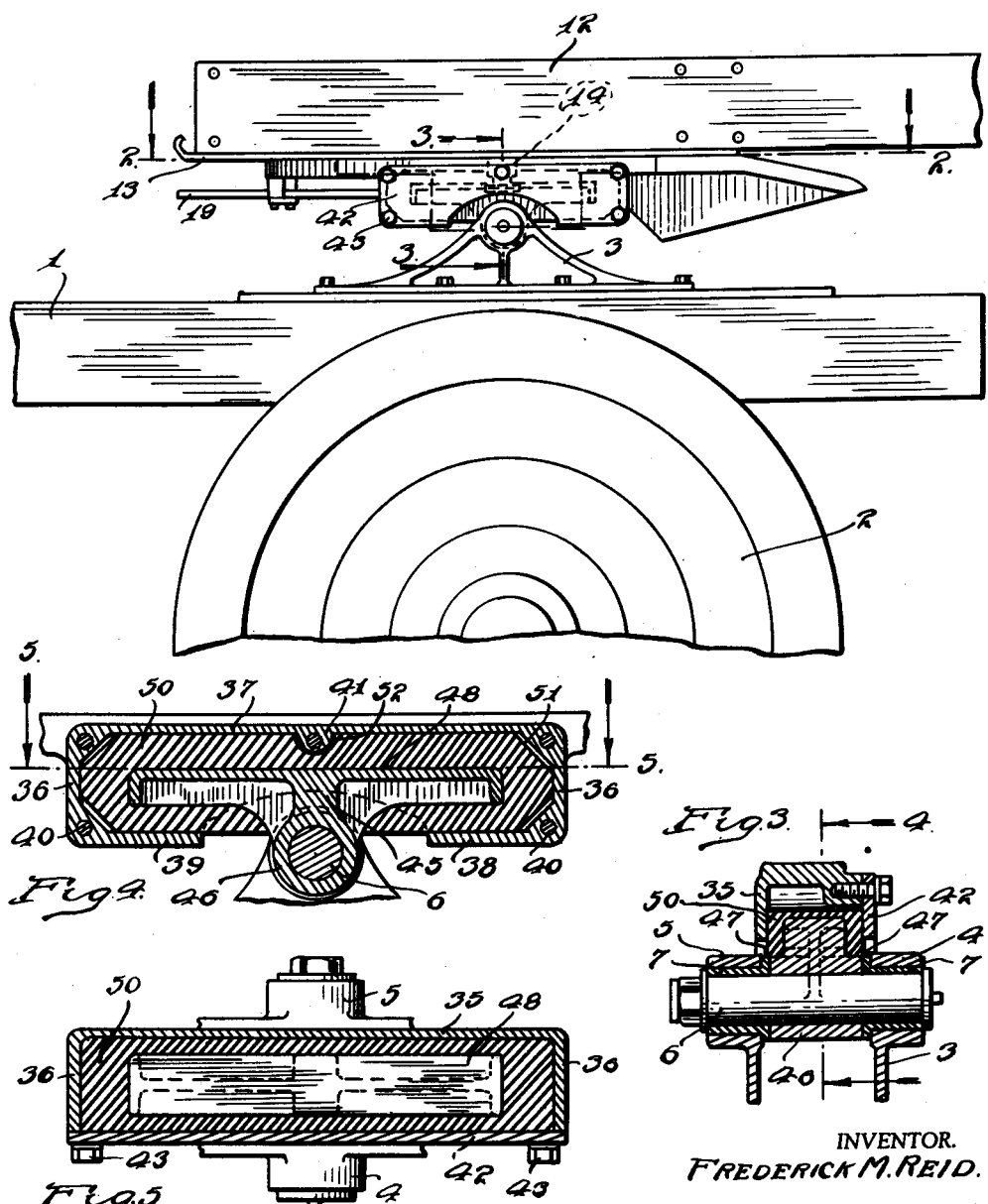
INVENTOR.
FREDERICK M. REID.
BY
Barnes, Kisselle & Laughlin
ATTORNEYS.

Sept. 5, 1933. F. M. REID 1,925,279
TRACTOR SEMITRAILER FIFTH WHEEL STRUCTURE
Filed Jan. 29, 1932  2 Sheets-Sheet 2
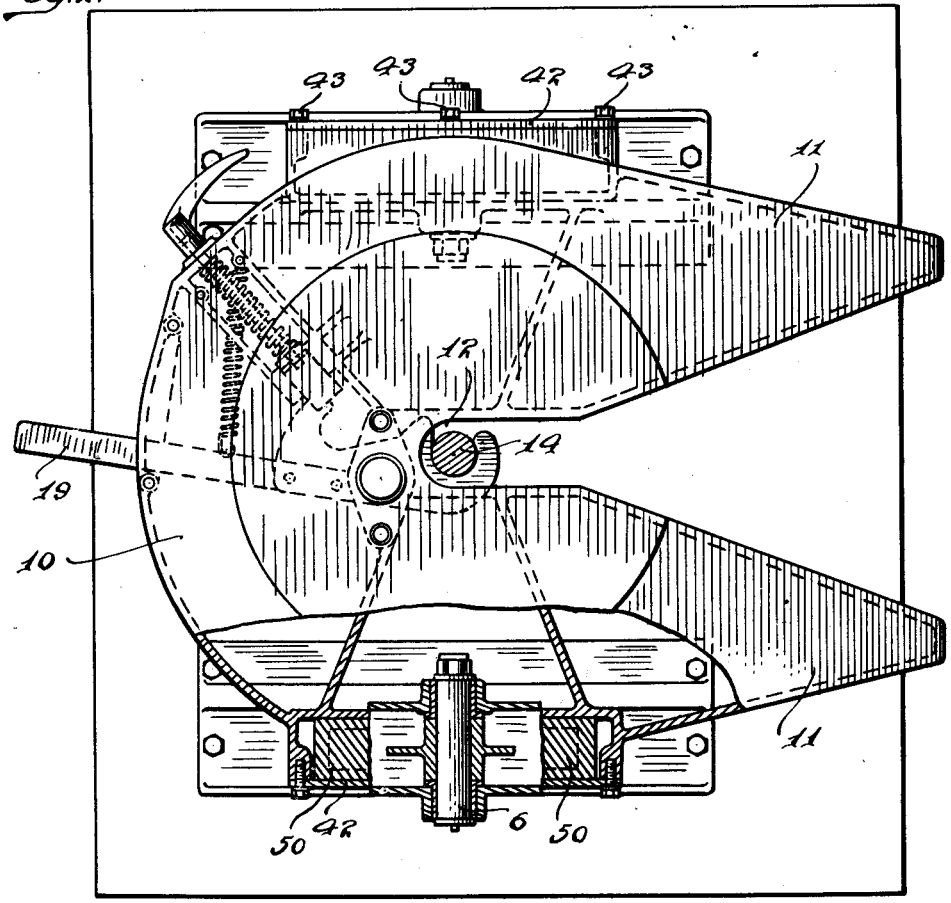

Patented Sept. 5, 1933

1,925,279

UNITED STATES PATENT OFFICE 1,925,279

TRACTOR SEMITRAILER FIFTH WHEEL STRUCTURE

Frederick Malcolm Reid, Detroit, Mich., assignor to Fruehauf Trailer Corporation, Detroit, Mich., a corporation of Michigan Application January 29, 1932. Serial No. 589,655

6 Claims. (Cl. 280—33.1)

This invention has to do with the art of tractors and semi-trailers and it relates particularly to such combined vehicles wherein they are connected through the means of an articulated connection such as a fifth wheel structure. Such a fifth wheel structure may include a lower fifth wheel member on the tractor and an upper fifth wheel member on the trailer, and the forward end of the trailer rests upon the tractor when the two vehicles are in combined operation.

One of the fifth wheel members may be mounted to its respective vehicle so that it may rock on a horizontal axis disposed transversely of the vehicle and such a member may constitute an inclined plane for elevating the semi-trailer as the tractor backs into it in the coupling, and when the vehicles are in coupled relation it may assume a horizontal position in abutment with the opposing fifth wheel member on the other vehicle.

The invention is more particularly directed toward an improved mounting of such a fifth wheel member. While such fifth wheel member may be on either vehicle it is shown herein as being mounted upon the tractor. A principal object of the invention is an improved mounting structure for such a fifth wheel member arranged to take up some of the shocks as may exist between the two vehicles so as to cushion the shock action in such manner as to deaden or eliminate noises or clatter as the semi-trailer may shift fore and aft as regards the tractor. The invention also aims to provide such a mounting so as to provide a cushion effect for side thrust for the semi-trailer relative to the tractor and also the invention is advantageous for facilitating the mounting of the fifth wheel member, particularly as regards lining up of the bearing members upon which the same may rock.

The invention may reside in a tractor semi-trailer fifth wheel structure wherein a king pin is employed and an improved king pin locking structure is provided.

In the accompanying drawings:

Fig. 1 is a side elevational view showing the rear end of a tractor and the forward end of a trailer connected through a fifth wheel means.

Fig. 2 is a view looking substantially on line 2—2 of Fig. 1 showing the lower fifth wheel in plan with parts cut away and with parts in section.

Fig. 3 is a sectional view taken substantially on line 3—3 of Fig. 1.

Fig. 4 is a sectional view showing various parts of the lower fifth wheel mounting and taken on line 4—4 of Fig. 3.

Fig. 5 is a horizontal section taken on line 5—5 of Fig. 4.

Fig. 6 is a detail plan illustrating the king pin locking member.

The frame of a tractor is illustrated at 1, having ground engaging wheels 2 which may be, and usually are, driving wheels. Mounted upon the tractor frame is a bracket 3; this bracket is for supporting the lower fifth wheel on the tractor and may be of a bifurcated construction having spaced members 4 and 5 apertured for the reception of journal bolt 6 which may be journaled in suitable bearings 7. There may be one of these brackets adjacent each side of the tractor as illustrated in Fig. 2 and the lower fifth wheel on the tractor is swiveled upon the bolts 6.

The lower fifth wheel may be somewhat circular in form, the same being illustrated at 10, and provided with rearwardly extending wings 11 which define a V-shaped opening leading into a notch or aperture 12 at the center. The upper fifth wheel on the trailer may comprise a suitably surfaced member for resting upon the lower fifth wheel 10 and it may be a plate or ring secured to the underneath side of the trailer frame. The trailer frame is illustrated at 12 and the upper fifth wheel at 13. Depending therefrom may be a king pin member 14. It will be understood that the lower fifth wheel may be arranged to tip rearwardly when the tractor and semi-trailer are disconnected; that during the coupling operation the tractor backs toward the trailer and the forward end of the trailer may ride up on the wings 11 so that the tractor moves under the trailer and may elevate same and the king pin slides through the V-opening and passes into the center opening 12.

A suitable latch is provided for holding the king pin in the locked position as illustrated in Fig. 2. Such latch may comprise a hook member 15 pivoted at 16 on the fifth wheel, having a heel 17 and a nose 18. An operating arm 19 may project from the hook member for manual operation. A coil spring 20 may be hooked to the arm and to a portion of the fifth wheel, normally holding the hook in open position as illustrated in Fig. 6. As the king pin enters the socket, as shown in Fig. 6, the same strikes the heel 17, swings the latch member on the axis 16 from the position shown in Fig. 6 to the position shown in Fig. 2 with an automatic action, and means are provided for holding the latch in locked position.

The latch member may have a curved surface 22 advantageously struck on a radius around the fulcrum 16 and this member may have a notch 23. The latch member may be underneath the fifth wheel 10, and also underneath the fifth wheel 10 there is carried a locking bolt. This locking bolt is shown at 25 slidably mounted in a suitably formed guide device in the under part of the fifth wheel and projecting from it may be a rod 26 having a handle 27. The lower fifth wheel may be formed with a box-like structure 28 and a spring such as a coil compression spring 29 may be located around the rod 26 and confined within the box structure. When the parts are in uncoupled relation, as illustrated in Fig. 6, the locking bolt is spring-pressed against the curved surface 22. When the king pin swings the latch to the position illustrated in Fig. 2 the locking bolt is urged into the notch 23 by the spring 29 and thus the king pin is locked in position by the bolt. A release of the parts may be effected by manual operation; this is accomplished by the operator utilizing handle 27 to retract the bolt 25 whereupon the spring 20 swings the latch to unlocked position. The latch may be manually manipulated by the arm 19 any time occasion arises for such manipulation. The draft of the king pin upon the latch tends to swing the same clockwise as Figs. 2 and 6 are viewed. This, of course, is overcome by the locking bolt in its socket, and as an aid in overcoming the draft and for strengthening the lower fifth wheel structure, angular bracing members or wings 30 may be cast integral with the lower fifth wheel member for bracing the socket for the bolt.

As heretofore explained, the lower fifth wheel member is rockably mounted upon the pins 6. In accordance with the present invention, however, there is a cushioned connection between the lower fifth wheel and the rocker pins. For this purpose, hollow or recessed-like members may be provided one on each side of the lower fifth wheel. Advantageously the lower fifth wheel may be a single casting and the recessed forming members may be integral therewith. These recessed members may open to the side of the lower fifth wheel; each may have a rear wall 35, end walls 36, a top wall 37, and bottom wall portions 38 and 39 separated for the passage therethrough of attaching means. As shown in Fig. 4, the corner portions of the recess may be thickened so that the same may be provided with apertures which may be threaded, the apertures being shown at 40, and a central boss on the top wall 37 as illustrated at 41 may be provided which also may be apertured. Thus a box-like structure is formed and the same may be closed by a cover plate 42 attached thereto by cap screws or the like 43 threaded into the above mentioned apertures.

Separate attaching means may be pivoted to the pins 6 of which there may be one at each side. Such attaching means may comprise a casting or forging 45 having a bearing member 46 designed to fit over a pin 6, as shown in Fig. 3, and to be disposed between the spaced parts of the bracket. The bearings 7 may have flanges 47 for taking the side thrust. The member 45 may project to opposite sides of the bearing member and these projecting portions may be T-shaped in cross-section as illustrated in Fig. 3 and may have a substantially flat upper surface as at 48. A block of rubber is designed to be formed around the members 45 leaving the bearing members 46 thereof exposed and such block of rubber is illustrated at 50. This block of rubber is so shaped as to be fitted into the recess or box structure of the lower fifth wheel. Preferably the corners of the block are cut away as at 51 to clear the corners of the box structure although the rubber block is preferably of sufficient overall dimensions as to abut against the end walls 36. The clearance provided by the cut away corners 51 permits the rubber to flow within the box structure. The rubber block is preferably also cut away or formed with a notch 52 for clearing the boss 41.

In making the assembly it will be understood that the rubber blocks may be mounted and vulcanized around the supporting members. Two of these members with their rubber coverings in place may now be secured to a lower fifth wheel member; this is accomplished by merely inserting the rubber blocks into the open ends of the box structures with the bearing members 46 projecting out through the spaced wall portions 38 and 39. The closure plates 42 may then be secured to the fifth wheel structure to close the box structure. The bearing members 46 may now be located between the bracket members 4 and 5 and the fulcrum pins then inserted through the bearings and fastened in place by nuts or the like.

Due to the use of the rubber blocks which serve to insulate the lower fifth wheel from the fulcrum pins, the lining up of the bearings 46 is materially facilitated for assembling purposes. In other words, if the bearings 46 be slightly out of line, a slight distortion of the rubber blocks readily permits insertion of the fulcrum pins. As the tractor and semi-trailer are used in combination, fore and aft movement of the semi-trailer, relative to the tractor, is cushioned by the rubber blocks and due to the fact that the rubber blocks are associated with their respective boxes so as to leave spaces therein, the rubber is free to flow in taking up the shock. Likewise, side thrust is cushioned, for, as will be seen with reference to Fig. 3, the rubber block is engaged on opposite sides by the rear wall 35 of the box and the cover plate 42 so that side thrust in either direction of the lower fifth wheel member is imparted to the bearing structure only through the interposed rubber. Furthermore, the invention facilitates manufacture as a shock absorbing fifth wheel mounting is provided eliminating the use of springs and other necessary parts which must be associated with springs. A further advantage occurs over the use of springs for heavy fore and aft shocks may cause the springs to completely collapse and result in a pounding action whereas complete collapse of this kind does not occur with the use of rubber insulating members confined in a box structure in accordance with the above disclosure.

I claim:

1. The combination with a tractor and semi-trailer having cooperating fifth wheel members for establishing an articulated connection, of pivotally mounted supporting devices on one vehicle for supporting the fifth wheel member on said vehicle, and means connecting the fifth wheel member on said vehicle to the pivotally mounted devices including rubber elements for insulating metal to metal contact between said devices and the fifth wheel member connected thereto and bodily movable with the pivotally mounted supporting devices.

2. The combination with a tractor and semi-trailer having cooperating fifth wheel members for establishing an articulated connection, pivot means for connecting one fifth wheel member to its respective vehicle, fifth wheel member supporting devices pivoted on said means, bodies of rubber covering portions of said devices and movable therewith, and means on the supported fifth wheel member for receiving the bodies of rubber in connected relation.

3. In a fifth wheel structure for a tractor semi-trailer, a fifth wheel member, a recess formed in said member, a bracket connected to one of the vehicles, a supporting member pivotally mounted upon the bracket having a body portion shaped to be received in the recess of the fifth wheel member, and a block of rubber enclosing the body portion and fitted into said recess, said block of rubber being shaped so as to fit into the recess and to provide clearance spaces for the flow of rubber thereinto.

4. In a fifth wheel connection between a tractor and semi-trailer, a fifth wheel member having a pair of hollow like members one adjacent each side of the vehicle, a pair of brackets secured to the vehicle, a supporting member pivotally mounted on each bracket, said supporting members having body portions adapted to be received in the hollow means on the fifth wheel member, and blocks of rubber formed around the body portions of the supporting members and movable bodily therewith and fitted into the hollow portions of the fifth wheel member.

5. In a fifth wheel connection between a tractor and semi-trailer, a fifth wheel member, a box-like structure on each side of the fifth wheel member, a pair of brackets on an adjacent vehicle, a pair of supporting devices, one pivotally mounted to each bracket, said supporting devices each having a body portion projecting from the pivotal connection, said box-like members each having an opening in one of its walls through which the supporting devices extend, and a block of rubber substantially surrounding the body portion of each supporting device and movable bodily therewith and fitted into the box structures.

6. In a fifth wheel connection between a tractor and semi-trailer, a fifth wheel member, box-like structures on diametrically opposite sides of the fifth wheel member and each opening outwardly from the fifth wheel member, a pair of supporting devices pivotally mounted to a vehicle, said supporting devices having body portions, a block of rubber formed around the body portions of the supporting devices and movable bodily therewith, said blocks of rubber being shaped to fit each within a box-like structure, and a closure plate for the opening of each box-like structure.

FREDERICK M. REID.

able therewith, and means on the supported fifth wheel member for receiving the bodies of rubber in connected relation.

3. In a fifth wheel structure for a tractor semi-trailer, a fifth wheel member, a recess formed in said member, a bracket connected to one of the vehicles, a supporting member pivotally mounted upon the bracket having a body portion shaped to be received in the recess of the fifth wheel member, and a block of rubber enclosing the body portion and fitted into said recess, said block of rubber being shaped so as to fit into the recess and to provide clearance spaces for the flow of rubber thereinto.

4. In a fifth wheel connection between a tractor and semi-trailer, a fifth wheel member having a pair of hollow like members one adjacent each side of the vehicle, a pair of brackets secured to the vehicle, a supporting member pivotally mounted on each bracket, said supporting members having body portions adapted to be received in the hollow means on the fifth wheel member, and blocks of rubber formed around the body portions of the supporting members and movable bodily therewith and fitted into the hollow portions of the fifth wheel member.

5. In a fifth wheel connection between a tractor and semi-trailer, a fifth wheel member, a box-like structure on each side of the fifth wheel member, a pair of brackets on an adjacent vehicle, a pair of supporting devices, one pivotally mounted to each bracket, said supporting devices each having a body portion projecting from the pivotal connection, said box-like members each having an opening in one of its walls through which the supporting devices extend, and a block of rubber substantially surrounding the body portion of each supporting device and movable bodily therewith and fitted into the box structures.

6. In a fifth wheel connection between a tractor and semi-trailer, a fifth wheel member, box-like structures on diametrically opposite sides of the fifth wheel member and each opening outwardly from the fifth wheel member, a pair of supporting devices pivotally mounted to a vehicle, said supporting devices having body portions, a block of rubber formed around the body portions of the supporting devices and movable bodily therewith, said blocks of rubber being shaped to fit each within a box-like structure, and a closure plate for the opening of each box-like structure.

FREDERICK M. REID.

DISCLAIMER 1,925,279.—*Frederick Malcolm Reid*, Detroit, Mich. TRACTOR SEMITRAILER FIFTH WHEEL STRUCTURE. Patent dated September 5, 1933. Disclaimer filed October 10, 1934, by the patentee, the assignee, *Fruehauf Trailer Corporation*, consenting.

Hereby enters this disclaimer to claims 1 and 2 which are in the following words, to wit:

"1. The combination with a tractor and semitrailer having cooperating fifth wheel members for establishing an articulated connection, of pivotally mounted supporting devices on one vehicle for supporting the fifth wheel member on said vehicle, and means connecting the fifth wheel member on said vehicle to the pivotally mounted devices including rubber elements for insulating metal to metal contact between said devices and the fifth wheel member connected thereto and bodily movable with the pivotally mounted supporting devices.

"2. The combination with a tractor and semitrailer having cooperating fifth wheel members for establishing an articulated connection, pivot means for connecting one fifth wheel member to its respective vehicle, fifth wheel member supporting devices pivoted on said means, bodies of rubber covering portions of said devices and movable therewith, and means on the supported fifth wheel member for receiving the bodies of rubber in connected relation."

[*Official Gazette October 30, 1934.*]

DISCLAIMER 1,925,279.—*Frederick Malcolm Reid*, Detroit, Mich. TRACTOR SEMITRAILER FIFTH WHEEL STRUCTURE. Patent dated September 5, 1933. Disclaimer filed October 10, 1934, by the patentee, the assignee, *Fruehauf Trailer Corporation*, consenting.

Hereby enters this disclaimer to claims 1 and 2 which are in the following words, to wit:

"1. The combination with a tractor and semitrailer having cooperating fifth wheel members for establishing an articulated connection, of pivotally mounted supporting devices on one vehicle for supporting the fifth wheel member on said vehicle, and means connecting the fifth wheel member on said vehicle to the pivotally mounted devices including rubber elements for insulating metal to metal contact between said devices and the fifth wheel member connected thereto and bodily movable with the pivotally mounted supporting devices.

"2. The combination with a tractor and semitrailer having cooperating fifth wheel members for establishing an articulated connection, pivot means for connecting one fifth wheel member to its respective vehicle, fifth wheel member supporting devices pivoted on said means, bodies of rubber covering portions of said devices and movable therewith, and means on the supported fifth wheel member for receiving the bodies of rubber in connected relation."

[*Official Gazette October 30, 1934.*]